United States Patent
Przygienda et al.

(10) Patent No.: US 12,411,837 B2
(45) Date of Patent: Sep. 9, 2025

(54) DEVICES, SYSTEMS, AND METHODS FOR UPDATING REMOTE DATABASES VIA FLOODED PACKET FRAGMENTS

(71) Applicant: Juniper Networks, Inc., Sunnyvale, CA (US)

(72) Inventors: Antoni B. Przygienda, Comano (CH); John G. Scudder, Ann Arbor, MI (US); Vishnu Pavan Kumar Beeram, Hyderabad (IN); Shraddha Hegde, Bangalore (IN); Anthony Joseph Li, Los Altos, CA (US); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 29 days.

(21) Appl. No.: 18/310,400

(22) Filed: May 1, 2023

(65) Prior Publication Data
US 2024/0370425 A1   Nov. 7, 2024

(51) Int. Cl.
  *G06F 16/00* (2019.01)
  *G06F 16/23* (2019.01)
(52) U.S. Cl.
  CPC ................ *G06F 16/2379* (2019.01)

(58) Field of Classification Search
  None
  See application file for complete search history.

(56) References Cited

U.S. PATENT DOCUMENTS

| 5,128,926 A | * | 7/1992 | Perlman | ............ H04L 69/00 370/410 |
| 2021/0194798 A1 | | 6/2021 | Joseph | |

FOREIGN PATENT DOCUMENTS

| EP | 2988452 A1 | 2/2016 |
| EP | 4459947 A1 | 11/2024 |

* cited by examiner

*Primary Examiner* — Anhtai V Tran
(74) *Attorney, Agent, or Firm* — Greenberg Traurig, LLP

(57) ABSTRACT

A disclosed computing device may include (1) a storage device configured to store a database that identifies states of nodes included in a network and (2) circuitry configured to (A) receive one or more packet fragments that account for at least one change made to a state of one of the nodes in a transaction, (B) identify, among the packet fragments, a transaction identifier corresponding to the transaction and an indication of a total number of packet fragments representing the transaction, and (C) update the database to account for the change upon ensuring receipt of all the packet fragments representing the transaction based at least in part on the transaction identifier and the indication. Various other devices, systems, and methods are also disclosed.

20 Claims, 10 Drawing Sheets

Implementation 600

Implementation 700

DEVICES, SYSTEMS, AND METHODS FOR UPDATING REMOTE DATABASES VIA FLOODED PACKET FRAGMENTS

BACKGROUND

Networks often include and/or represent nodes that facilitate and/or support the flow of traffic between endpoints. To coordinate and/or map their topologies, these networks may implement and/or utilize routing protocols, such as intermediate system to intermediate system (IS-IS). Such routing protocols may enable nodes that make changes to their onboard routing databases to propagate these changes to other nodes. For example, a node included in a network may make certain changes (e.g., additions and/or deletions of certain routes, links, and/or prefixes) to its onboard routing database. In this example, to facilitate consistency and/or compatibility across the network, this node may generate an update representative of these changes for propagation to other nodes included in the network.

In some examples, the network may include and/or represent certain interfaces with maximum transmission units (MTUs) that limit the individual packet size of such updates. As a result, if the size of an update generated by a node exceeds the MTU, the node may need to divide and/or split the update into packet fragments that comply with the MTU. The node may then transmit the packet fragments across the network via flooding to enable other nodes to update their routing databases accordingly. For example, after receiving all the packet fragments corresponding to the update, another node included in the network may modify its onboard routing database to reflect the changes made on the originating node.

Unfortunately, packet fragments corresponding to an update may be flooded as independent objects from the originating node, as opposed to being flooded together simultaneously. As a result, one of the other nodes may receive some of the packet fragments corresponding to the update but may be unaware of one or more others. This lack of awareness may lead and/or cause the other node to process and/or apply a random or incomplete set of packet fragments, thereby rendering this other node's database temporarily inconsistent with the originating node's database. In other words, the update may fail to propagate properly throughout the network due at least in part to this lack of awareness. The resulting database inconsistencies may lead to and/or cause various routing problems (e.g., route flapping, traffic loss, ghosting out route information, anomalous information provided to network tooling, etc.) for the network.

The instant disclosure, therefore, identifies and addresses a need for additional devices, systems, and methods that facilitate updating remote databases via flooded packet fragments in an atomic fashion.

SUMMARY

As will be described in greater detail below, the instant disclosure generally relates to devices, systems, and methods for updating remote databases via flooded packet fragments. In one example, a computing device for accomplishing such a task may include and/or represent (1) a storage device configured to store a database that identifies states of nodes included in a network and (2) circuitry configured to (A) receive one or more packet fragments that account for at least one atomic change made to a state of one of the nodes in a transaction, (B) identify, among the packet fragments, a transaction identifier corresponding to the transaction and identifiers for the packet fragments, and (C) update the database to account for the change upon ensuring receipt of all the packet fragments based at least in part on the transaction identifier and the identifiers for the packet fragments.

Similarly, a corresponding system may include and/or represent (1) a first node included in a network and configured to (A) change a state of a database in a transaction and (B) transmit one or more packet fragments that account for the change through the network and (2) a second node included in the network and configured to (A) receive the packet fragments, (B) identify, among the packet fragments, a transaction identifier corresponding to the transaction and identifiers for the packet fragments, and (C) update an additional database to account for the change upon ensuring receipt of all the packet fragments.

Additionally or alternatively, a corresponding method may include and/or involve (1) receiving one or more packet fragments that account for at least one change made to a state of a node in a transaction, (2) identifying, among the packet fragments, a transaction identifier corresponding to the transaction and identifiers for the packet fragments, and (3) updating the database to account for the change upon ensuring receipt of all the packet fragments based at least in part on the transaction identifier and the identifiers for the packet fragments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
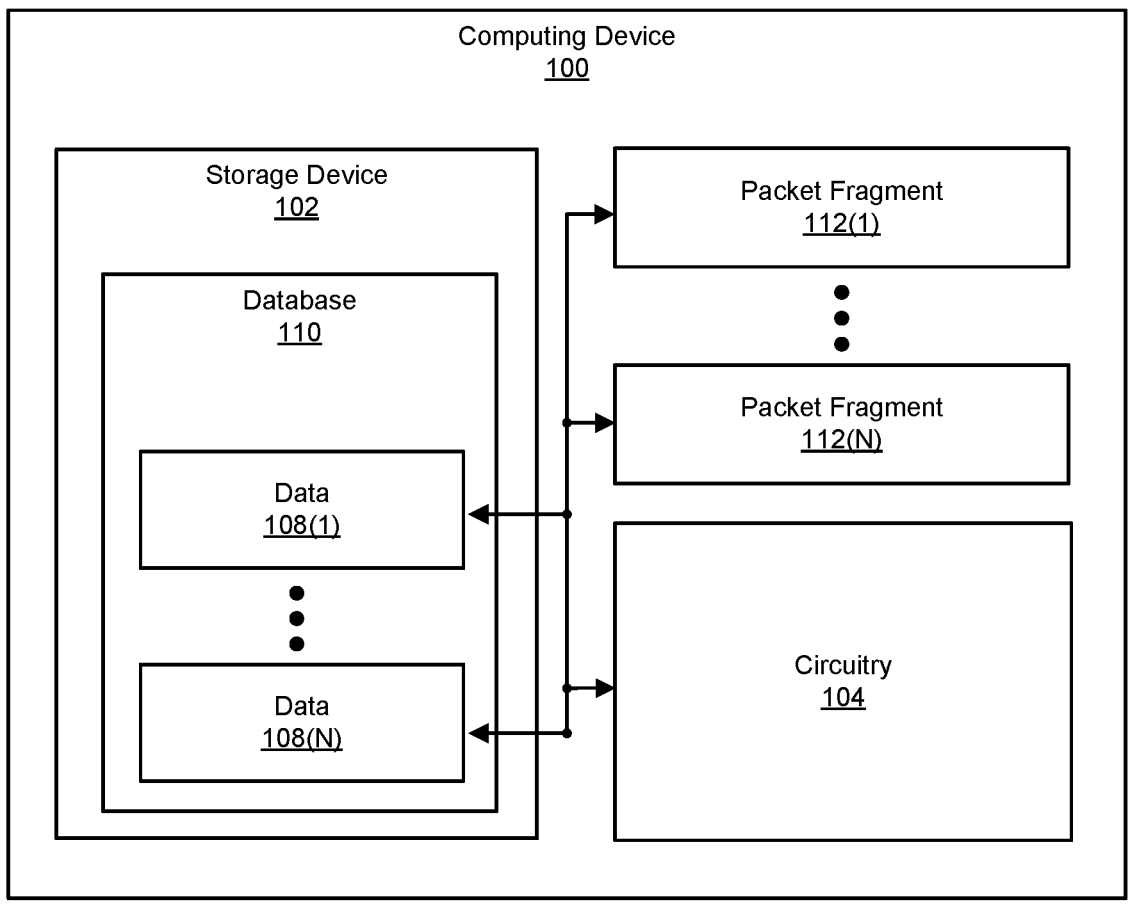
FIG. 1 is a block diagram of an exemplary computing device capable of updating remote databases via flooded packet fragments according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various devices, systems, and methods for updating remote databases via flooded packet fragments. As will be explained in greater detail below, embodiments of the instant disclosure may include and/or involve a network of nodes (e.g., routers and/or switches) that facilitate and/or support the flow of traffic between endpoints. For example, a first node included in a network may change a state of an IS-IS database in a transaction (e.g., by adding, removing, and/or modifying one or more routes, links, and/or prefixes). In this example, the first node may flood the changed state to the network by transmitting and/or advertising one or more packet fragments that account for the change to facilitate updating the IS-IS databases of other nodes included in the network.

In some examples, a second node included in the network may receive those packet fragments. In one example, the second node may identify, among the packet fragments, a transaction identifier corresponding to the transaction and identifiers for the packet fragments corresponding to the transaction. For example, the second node may receive the packet fragments at varying times and discover or learn how many packet fragments to expect in connection with the transaction by examining and/or analyzing the first one to arrive. In this example, during the examination and/or analysis of the first packet fragment to arrive, the second node may find and/or locate the identifiers for the packet fragments transmitted by the first node in connection with the transaction.

In some examples, to align and/or mirror the states of the IS-IS databases on the first and second nodes, the second node may process and/or apply certain data included in the packet fragments to account for the change made on the first node in connection with the transaction. By doing so, the second node may effectively update the state of its IS-IS database to reflect the change made on the first node. This update may constitute and/or represent a modification to the network topology. However, since the change made to the state of the IS-IS database may span and/or be distributed across the entire set of packet fragments corresponding to and/or representative of the transaction, the second node may wait until receiving all those packet fragments before processing and/or applying the same to its IS-IS database. For that reason, the second node may depend on the identifiers for the packet fragments to determine when to process and/or apply the data included in those packet fragments to the IS-IS database.

The identifiers for the packet fragments may appear and/or be presented in various formats and/or contexts. For example, packet fragments may include and/or contain a list of identifiers for all the packet fragments transmitted in connection with a certain transaction. In one example, packet fragments may include and/or contain information that indicates the cardinality and/or total number of the packet fragments corresponding to and/or representative of a certain transaction. In another example, packet fragments may include and/or contain information that indicates and/or is used to determine one or more dependencies external to and/or beyond a certain transaction (e.g., one or more packet fragments from an earlier transaction).

The various devices, systems, and methods described herein may enable nodes included in a network to become aware of the all the packet fragments corresponding to and/or representative of certain IS-IS transactions. This awareness may prevent these nodes from processing and/or applying random or incomplete sets of packet fragments corresponding to and/or representative of such IS-IS transactions. As a result, these nodes may be able to avoid certain database inconsistencies and mitigate and/or prevent various routing problems (e.g., route flapping, traffic loss, ghosting out route information, anomalous network tooling, etc.) within the network.

The following will provide, with reference to FIGS. 1-8 detailed descriptions of exemplary devices, systems, components, and corresponding implementations for updating remote databases via flooded packet fragments. Detailed descriptions of computer-implemented methods for updating remote databases via flooded packet fragments will be provided in connection with FIG. 9. In addition, detailed descriptions of an exemplary computing system for carrying out these methods will be provided in connection with FIG. 10.

FIG. 1 illustrates an exemplary computing device 100 for updating remote databases via flooded packet fragments. As illustrated in FIG. 1, exemplary computing device 100 may include and/or represent a storage device 102, circuitry 104, and/or one or more packet fragments 112(1)-(N). In some examples, storage device 102 may store, facilitate, and/or support a database 110 that includes and/or represents data 108(1)-(N) relative to a network topology. For example, data 108(1)-(N) may constitute and/or represent states of databases on nodes included in a network. In one example, database 110 may include and/or represent one or more routing tables, routing information bases (RIBs), forwarding tables, forwarding information bases (FIBs), and/or link-state databases.

In some examples, database 110 may implement and/or be formatted in accordance with one or more routing and/or forwarding protocols (e.g., IS-IS). In one example, data 108(1)-(N) may include and/or represent information (e.g., routes, links, and/or prefixes) corresponding to the topology of a network involving computing device 100. Additionally or alternatively, data 108(1)-(N) may enable computing device 100 to route and/or forward traffic to one or more nodes of the network.

In some examples, computing device 100 may include and/or represent one or more hardware, firmware, and/or software components or features that are not necessarily illustrated and/or labeled in FIG. 1. For example, computing device 100 may also include and/or represent communication ports, buses, additional analog and/or digital circuitry, onboard logic, radio-frequency (RF) transmitters, RF receivers, transceivers, antennas, transistors, resistors, capacitors, diodes, inductors, switches, registers, flipflops, connections, traces, buses, semiconductor (e.g., silicon) devices and/or structures, additional processing devices, additional storage devices, circuit boards, sensors, packages, substrates, housings, combinations or variations of one or more of the same, and/or any other suitable components or features that facilitate and/or support updating remote databases via flooded packet fragments.

In some examples, computing device 100 may include and/or represent one or more firmware and/or software modules for performing one or more tasks in connection updating remote databases via flooded packet fragments. In one example, one or more of these modules may include and/or represent one or more software applications or programs that, when executed by circuitry 104, cause and/or direct circuitry 104 to perform one or more tasks. Additionally or alternatively, one or more of these modules may also include and/or represent some or all of an executable file, a code snippet, and/or a computer-readable instruction used to program and/or configure circuitry 104.

In some examples, storage device 102 may include and/or represent any type or form of volatile or non-volatile memory device, medium, and/or system capable of storing data and/or computer-readable instructions. In one example, storage device 102 may store, load, and/or maintain database 110. Although illustrated as a single unit in FIG. 1, storage device 102 may alternatively include and/or represent a distributed storage system consisting of multiple memory units. Examples of storage device 102 include, without limitation, random access memory (RAM), read only memory (ROM), flash memory, hard disk drives, (HDDs), solid-state drives (SSDs), optical disk drives, caches, variations or combinations of one or more of the same, and/or any other suitable storage memory devices.

In some examples, circuitry 104 may include and/or represent one or more electrical and/or electronic circuits capable of processing, applying, modifying, transforming, transmitting, receiving, and/or executing instructions and/or data. In one example, circuitry 104 may access, modify, transmit, and/or receive data 108(1)-(N). Additionally or alternatively, circuitry 104 may launch, perform, and/or execute certain executable files, code snippets, and/or computer-readable instructions to facilitate and/or support updating remote databases via flooded packet fragments. Although illustrated as a single unit in FIG. 1, circuitry 104 may include and/or represent a collection of multiple processing units and/or electrical or electronic components that work and/or operate in conjunction with one another. Examples of circuitry 104 include, without limitation, processing devices, microprocessors, microcontrollers, central processing units (CPUs), field-programmable gate arrays (FPGAs), application-specific integrated circuits (ASICs), systems on chips (SoCs), parallel accelerated processors, tensor cores, integrated circuits, chiplets, portions of one or more of the same, variations or combinations of one or more of the same, and/or any other suitable circuitry.

In some examples, packet fragments 112(1)-(N) may include and/or represent packets transmitted and/or received via a network. In one example, packet fragments 112(1)-(N) may collectively account for and/or represent one or more changes made to the state of database 110 in a certain transaction. For example, packet fragments 112(1)-(N) may include and/or represent data 108(1)-(N), routes, links, and/or prefixes affected by or involved in the changes made to database 110. Accordingly, packet fragments 112(1)-(N) may collectively account for and/or represent an update intended and/or destined for one or more nodes of the network.

In some examples, packet fragments 112(1)-(N) may include and/or represent packets that have been sized and/or split to comply with an MTU that limits the size of an update and/or its constituent pieces. In one example, packet fragments 112(1)-(N) may include and/or represent IS-IS packets that are flooded across and/or through the network to enable certain nodes to account for and/or reflect the changes made to database 110. Accordingly, these nodes may be able to update their respective IS-IS databases to align with and/or mirror database 110, thereby achieving consistent states across the network. In certain implementations, packet fragments 112(1)-(N) may include and/or represent link state protocol (LSP) fragments.

In some examples, computing device 100 may include and/or represent any type or form of physical device and/or system capable of reading computer-executable instructions, processing or transforming data, handling network traffic, and/or updating databases via flooded packet fragments. In one example, computing device 100 may include and/or represent a node that facilitates and/or supports the flow of traffic within a network and/or across networks. Additional examples of computing device 100 include, without limitation, network devices, routers (such as a transit label switching router, a label edge router, a provider edge router, a hub router, a spoke router, an autonomous system boundary router, and/or an area border router), switches, hubs, modems, bridges, repeaters, gateways (such as broadband network gateways), multiplexers, network adapters, network interfaces, linecards, collectors, client devices, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing device.

Figure 2:
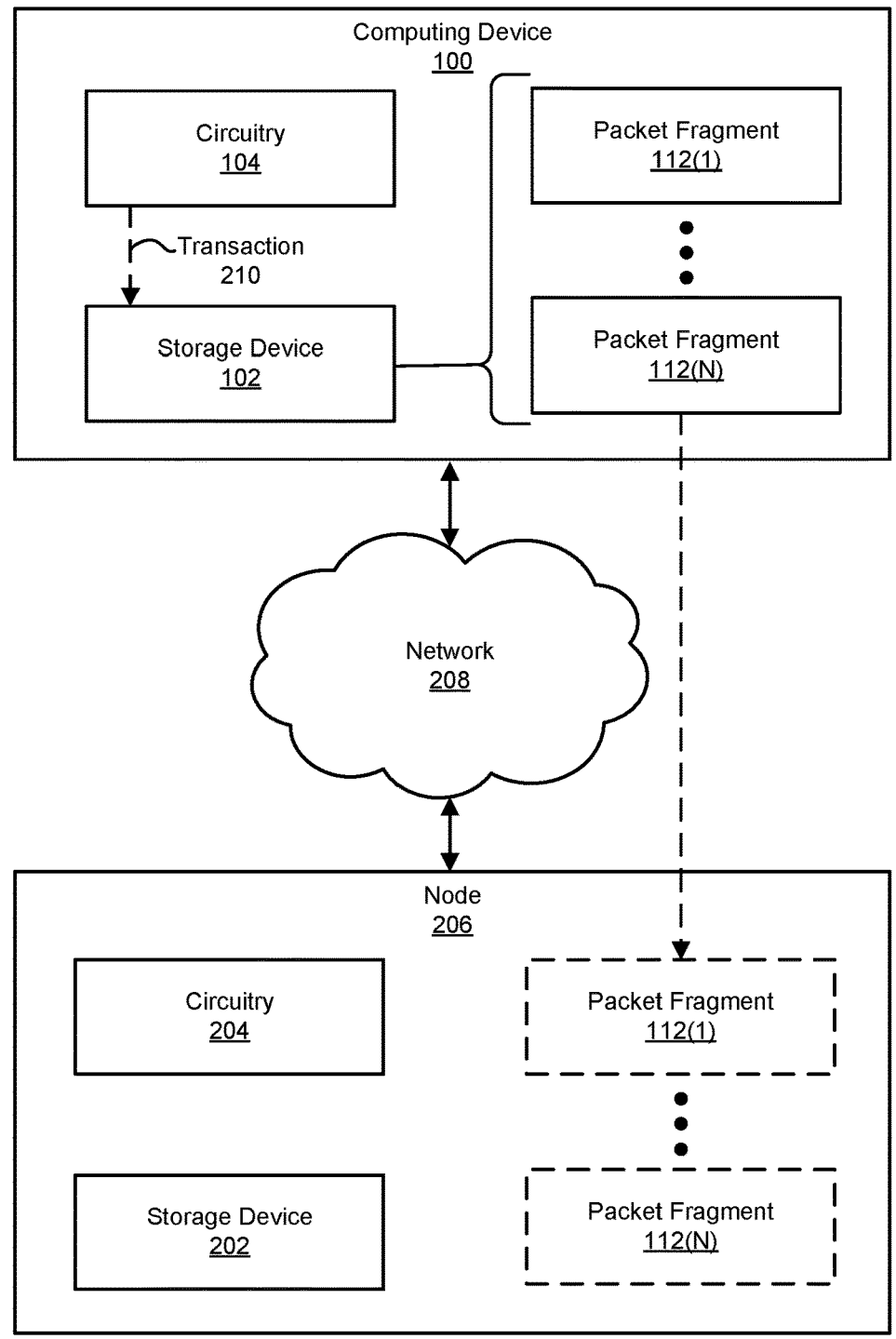
FIG. 2 is a block diagram of an exemplary system for updating remote databases via flooded packet fragments according to one or more embodiments of this disclosure.

Exemplary computing device 100 in FIG. 1 may be implemented in a variety of ways. For example, all or a portion of exemplary computing device 100 may include and/or represent portions of an exemplary system 200 in FIG. 2. As illustrated in FIG. 2, exemplary system 200 may include and/or represent computing device 100 and node 206 communicatively coupled to one another via a network 208. Although illustrated as being external to network 208 in FIG. 2, computing device 100 and/or node 206 may alternatively represent portions of network 208 and/or be included in network 208.

In some examples, node 206 may include and/or represent a storage device 202 that stores a database, circuitry 204, and/or packet fragments 112(1)-(N). Like computing device 100 in FIG. 1, node 206 may include and/or represent any type or form of physical device and/or system capable of reading computer-executable instructions, processing or transforming data, handling network traffic, and/or updating databases via flooded packet fragments. In one example, node 206 may include and/or represent certain devices, components, configurations, and/or features that perform and/or provide functionalities that are similar and/or identical to those described above in connection with FIG. 1.

In some examples, network 208 may include and/or represent any medium and/or architecture capable of facilitating device-to-device communication, data transfer, and/or topology updates. In one example, network 208 may facilitate and/or support communications between computing device 100 and node 206. In this example, network 208 may include other nodes and/or computing devices that are not necessarily illustrated and/or labelled in FIG. 2. Network 208 may facilitate communication or data transfer using wireless and/or wired connections. Examples of network 208 include, without limitation, an intranet, an access network, a layer 2 network, a layer 3 network, a multiprotocol label switching (MPLS) network, an Internet protocol (IP) network, a heterogeneous network (e.g., layer 2, layer 3, IP, and/or MPLS) network, a wide area network (WAN), a local area network (LAN), a personal area network (PAN), the Internet, power line communications (PLC), a cellular network, portions of one or more of the same, variations or combinations of one or more of the same, and/or any other suitable network.

In some examples, computing device 100 may change, modify, and/or update the state of database 110 on storage device 102. For example, circuitry 104 of computing device 100 may add one or more routes, links, and/or prefixes to database 110 in a single transaction. Additionally or alternatively, circuitry 104 may modify and/or alter one or more routes, links, and/or prefixes in database 110 as part of the single transaction. Additionally or alternatively, circuitry 104 may delete and/or remove one or more routes, links, and/or prefixes from database 110 as part of the single transaction.

In some examples, a transaction may include and/or represent one or more changes made to database 110 since the last time that computing device 100 transmitted and/or advertised an update. For example, computing device 100 may change the state of database 110 at a first moment in time and then transmit one or more packet fragments corresponding to that change through network 208. In this example, computing device 100 may subsequently change the state of database 110 again at a second moment in time and then transmit one or more additional packet fragments corresponding to that subsequent change through network 208. In this example, all the changes made to database 110 at the first moment in time may constitute and/or represent a first transaction, and all the changes made to database 110 at the second moment in time may constitute and/or represent a second transaction.

In some examples, each transaction may correspond to and/or be associated with a specific transaction identifier. In one example, the transaction identifier may include and/or represent a global object identifier represented by a single number that is incremented and/or increased monotonically with each transaction that effectuates one or more changes to database 110. For example, if one transaction occurring on computing device 100 is represented by the transaction identifier "200", then the very next transaction occurring on computing device 100 may be represented by the transaction identifier "201".

In some examples, circuitry 104 may make one or more changes to the state of database 110 on storage device 102 in a transaction 210. In one example, to update the rest of network 208 to reflect these changes, circuitry 104 may generate and/or produce one or more packet fragments 112(1)-(N) that account for and/or represent these changes. In this example, circuitry 104 may then transmit and/or advertise packet fragments 112(1)-(N) across and/or through network 208 via flooding.

In some examples, packet fragments 112(1)-(N) may traverse and/or travel through network 208 before arrive at and/or reaching node 206. In one example, packet fragments 112(1)-(N) may arrive at and/or reach node 206 at varying times. Accordingly, one of packet fragments 112(1)-(N) may arrive at and/or reach node 206 before the others. For example, packet fragment 112(1) may arrive at and/or reach node 206 before packet fragment 112(N). In this example, circuitry 204 of node 206 may receive packet fragment 112(1) and then evaluate and/or analyze certain features of packet fragment 112(1).

In some examples, circuitry 204 may search packet fragment 112(1) for a transaction identifier and/or identifiers for packet fragments corresponding to and/or representative of the relevant transaction. For example, during a search of packet fragment 112(1), circuitry 204 may find and/or identify a transaction identifier indicating that packet fragment 112(1) corresponds to transaction 210. In this example, during the search of packet fragment 112(1), circuitry 204 may also find and/or locate identifiers for packet fragments 112(1)-(N) corresponding to and/or representative of transaction 210.

In some examples, circuitry 204 may wait to process and/or apply packet fragment 112(1) until circuitry 204 has received all of packet fragments 112(1)-(N). For example, if the fragment identifiers suggest that there are 5 other fragments that correspond to transaction 210, circuitry 204 may wait until those 5 other fragments arrive at node 206 before processing and/or applying any of packet fragments 112(1)-(N) to reflect the changes made to database 110 in transaction 210. In this example, once all 5 of those other fragments arrive at node 206, circuitry 204 may process and/or apply the changes represented in packet fragments 112(1)-(N) to a database stored on storage device 202 of node 206. Put differently, circuitry 204 may update the database on node 206 to account for the changes made to the state of database 110 in transaction 210 upon ensuring receipt of all of packet fragments 112(1)-(N). As a result of this update, the states of database 110 and the database stored on storage device 202 may be consistent with one another for at least a moment in time (e.g., until a subsequent transaction occurs). However, despite this update, it may also be possible that the states of database 110 and the database stored on storage device 202 are never consistent with one another at any moment in time (e.g., due at least in part to intervening transactions).

In some examples, packet fragments 112(1)-(N) may be encoded and/or formatted in a type-length-value (TLV) scheme. In one example, packet fragments 112(1)-(N) may each include and/or contain the transaction identifier corresponding to transaction 210. Additionally or alternatively, packet fragments 112(1)-(N) may each include and/or contain the identifiers for packet fragments 112(1)-(N) representative of the transaction 210.

In some examples, the fragment identifiers may appear and/or be presented in various formats and/or contexts. For example, packet fragments 112(1)-(N) may include and/or contain a list of all the packet fragments transmitted and/or advertised in connection with transaction 210. In one example, this list may include and/or specify fragment identifiers for packet fragments 112(1)-(N). In this example, the list may serve, function, and/or act as an indication of the total number of packet fragments 112(1)-(N) corresponding to transaction 210.

In another example, packet fragments 112(1)-(N) may include and/or contain information that indicates the cardinality and/or total number of packet fragments corresponding to transaction 210. For example, one of packet fragments 112(1)-(N) may include and/or represent a catalog that identifies a sequence of packet fragments 112(1)-(N) corresponding to transaction 210. In this example, the cardinality may serve, function, and/or act as an indication of the total number of packet fragments 112(1)-(N) corresponding to transaction 210.

In an additional example, packet fragments 112(1)-(N) may include and/or contain information that indicates and/or is used to determine one or more dependencies external to and/or beyond transaction 210. For example, packet fragments 112(1)-(N) may reference and/or depend on one or more packet fragments from an earlier transaction to achieve consistency between database 110 and the database on node 206. Accordingly, circuitry 204 may be unable to align and/or mirror the state of database 110 on node 206 without those packet fragments from the earlier transaction in addition to packet fragments 112(1)-(N). In this additional example, the information may serve, function, and/or act as part of an indication of the total number of packet fragments corresponding to transaction 210 due at least in part to those dependencies. In certain implementations, circuitry 204 may maintain and/or store previous versions of certain packet fragments from earlier transactions to accommodate such dependencies and/or achieve a certain state.

Figure 3:
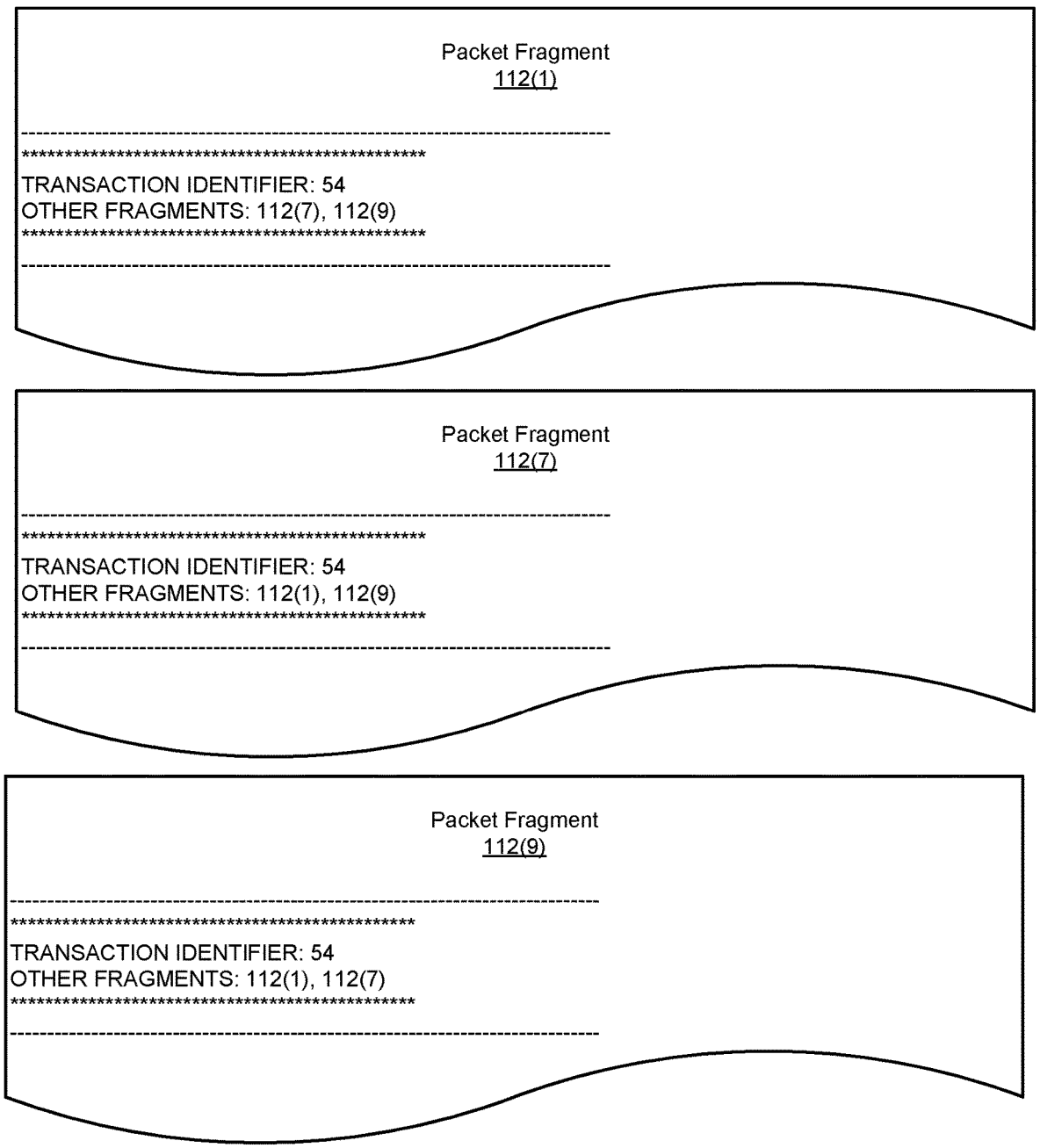
FIG. 3 is an illustration of an exemplary implementation involving a set of packet fragments for updating a remote database according to one or more embodiments of this disclosure.

FIGS. 3-9 illustrate exemplary implementations of fragment sets that facilitate updating remote databases via flooded packet fragments to achieve consistency across a network. In some examples, the exemplary implementations illustrated in FIGS. 3-9 may include and/or represent certain components, configurations, and/or features that perform and/or provide functionalities that are similar and/or identical to those described above in connection with FIG. 1 or FIG. 2. As illustrated in FIG. 3, an exemplary implementation 300 may include and/or involve a set of packet fragments 112(1), 112(7), and 112(9).

In some examples, computing device 100 may generate packet fragments 112(1), 112(7), and 112(9) in connection with one or more changes made to database 110 in a single transaction. In one example, computing device 100 may transmit and/or flood packet fragments 112(1), 112(7), and 112(9) across and/or through network 208. In this example, node 206 may receive packet fragments 112(1), 112(7), and 112(9) as they traverse and/or travel through network 208.

In some examples, node 206 may receive packet fragment 112(1) before packet fragments 112(7) and 112(9). In one example, packet fragments 112(1), 112(7), and 112(9) may each include and/or contain a transaction identifier "54" and a list of other fragments corresponding to transaction "54". For example, the lists may each include and/or represent the fragment identifiers for every other packet fragment corresponding to and/or representative of transaction "54". In this example, upon receiving packet fragment 112(1), node 206 may analyze packet fragment 112(1) and determine, based at least in part on this analysis, that packet fragments 112(1), 112(7), and 112(9) all correspond to transaction "54"-even though packet fragments 112(7) and 112(9) have yet to arrive at node 206. In view of this determination, node 206 may wait for packet fragments 112(7) and 112(9) to arrive before processing packet fragment 112(1). Accordingly, node 206 may refrain from processing any of packet fragments 112(1), 112(7), and 112(9) until all of them have arrived.

Figure 4:
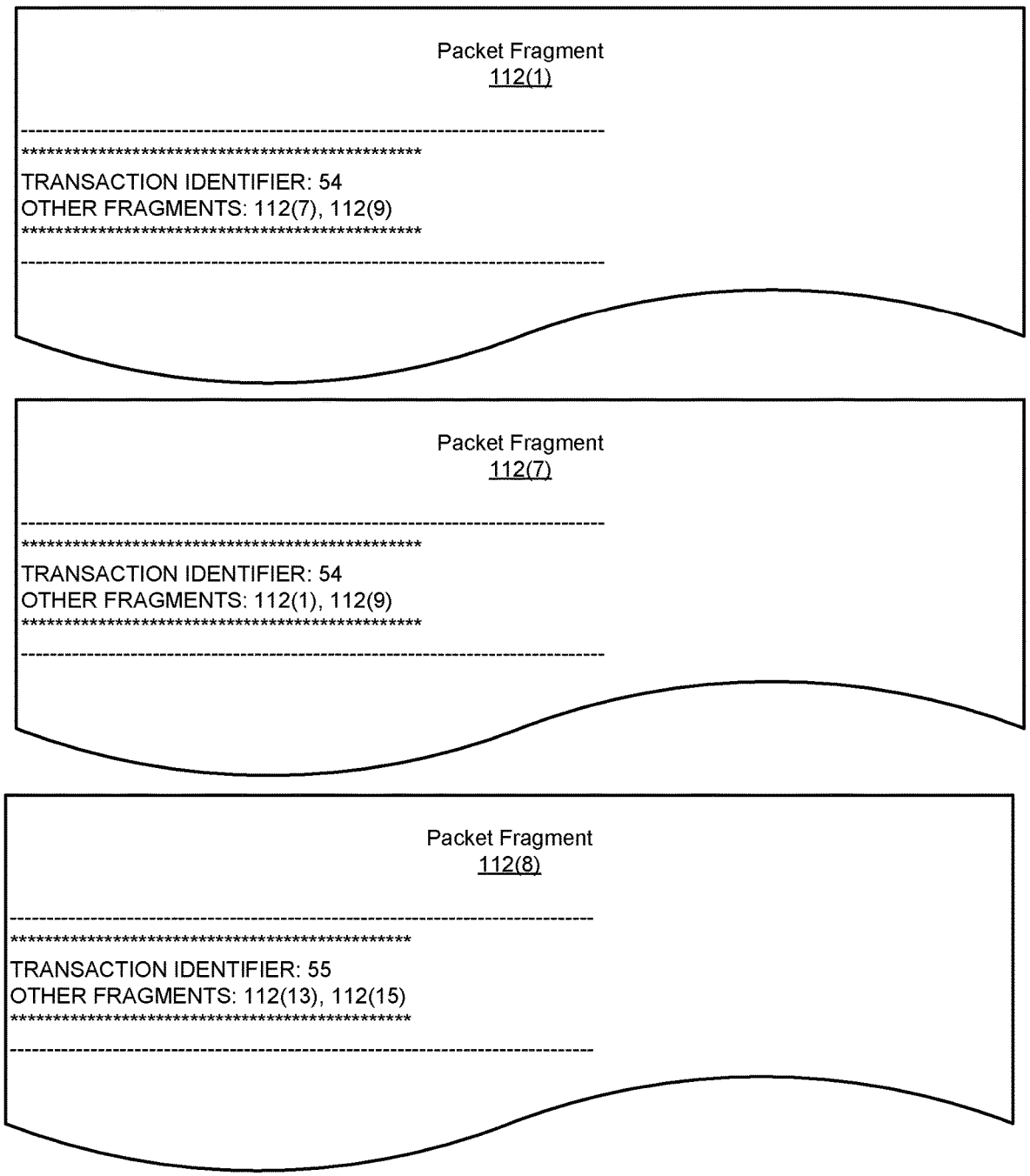
FIG. 4 is an illustration of an exemplary implementation involving a set of packet fragments for updating a remote database according to one or more embodiments of this disclosure.

As illustrated in FIG. 4, an exemplary implementation 400 may include and/or involve a set of at least packet fragments 112(1), 112(7), and 112(8). In some examples, computing device 100 may generate packet fragments 112(1) and 112(7) in connection with one or more changes made to database 110 in a single transaction. In such examples, computing device 100 may generate packet fragment 112(8) in connection with one or more additional changes made to database 110 in a subsequent transaction. In one example, computing device 100 may transmit and/or flood packet fragments 112(1), 112(7), and 112(8) across and/or through network 208. In this example, node 206 may receive packet fragments 112(1), 112(7), and 112(8) as they traverse and/or travel through network 208.

In some examples, node 206 may receive packet fragment 112(1) before packet fragments 112(7) and 112(8). In one example, packet fragments 112(1) and 112(7) may each include and/or contain a transaction identifier "54" and a list of other fragments corresponding to transaction "54". In this example, packet fragment 112(8) may each include and/or contain a transaction identifier "55" and a list of other fragments corresponding to transaction "55", meaning that packet fragment 112(8) resulted from the transaction that occurred just after transaction "54" on computing device 100.

Upon receiving packet fragment 112(1), node 206 may analyze packet fragment 112(1) and determine, based at least in part on this analysis, that packet fragments 112(1), 112(7), and 112(9) all correspond to transaction "54"-even though packet fragments 112(7) and 112(9) have yet to arrive at node 206. In one example, node 206 may subsequently receive packet fragment 112(7) and then analyze the same. However, node 206 may still be waiting for packet fragment 112(9) to complete the set corresponding to transaction "54" that occurred on computing device 100.

In the meantime, node 206 may receive packet fragment 112(8) and then analyze the same. During this analysis, node 206 may determine that packet fragments 112(8), 112(13) and 112(15) all correspond to transaction "55"-even though packet fragments 112(13) and 112(15) have yet to arrive at node 206. Because packet fragments containing transaction identifier "55" arrived before node 206 received packet fragment 112(9), node 206 may need to track, maintain, and/or store both of transaction identifiers "54" and "55" until all the remaining packet fragments from those transactions arrive. In view of this observation, node 206 may wait for packet fragment 112(9) to arrive before processing all the packet fragments corresponding to transaction "54". Additionally or alternatively, node 206 may wait for packet fragments 112(13) and 112(15) to arrive before processing all the packet fragments corresponding to transaction "55".

Figure 5:
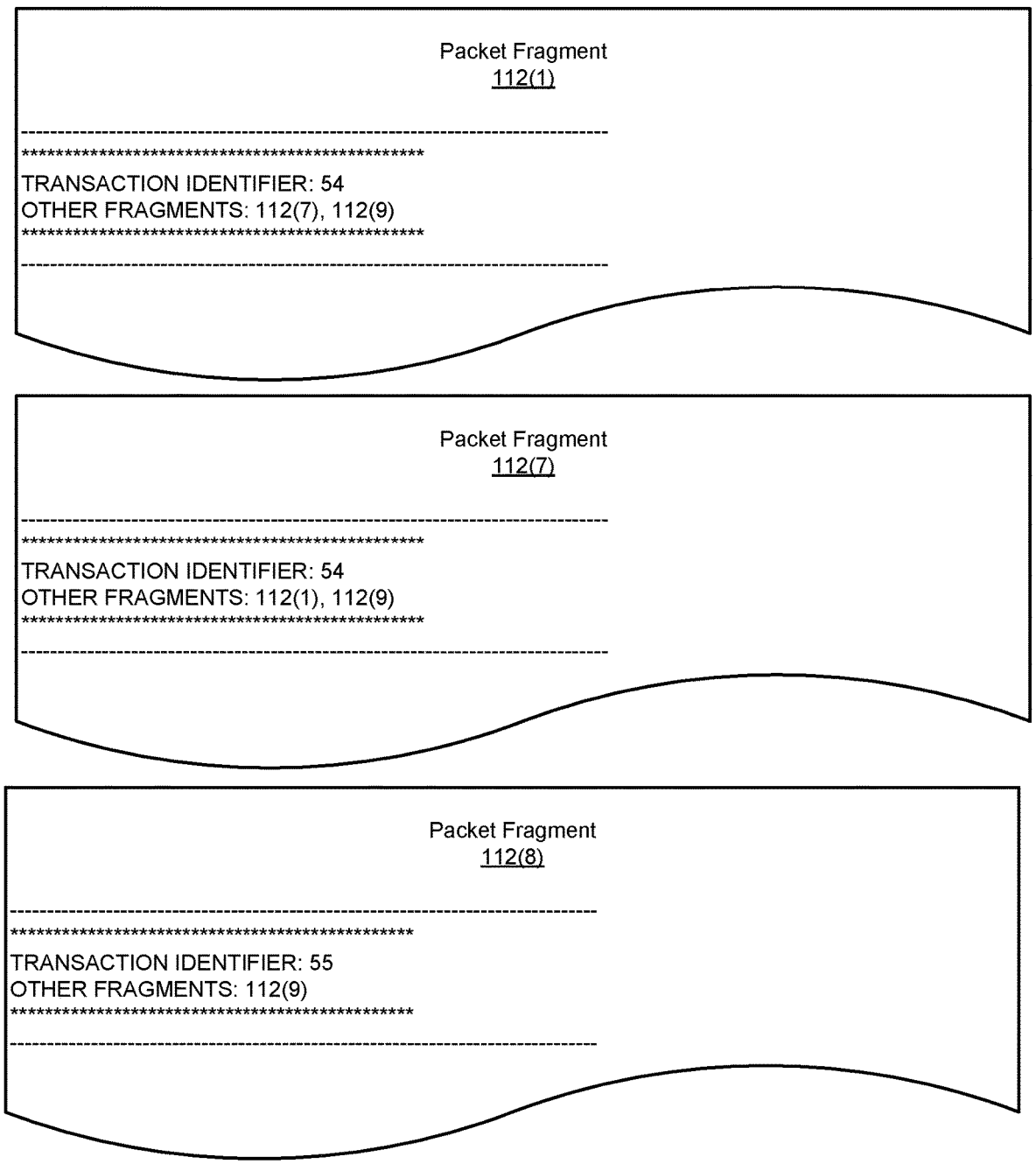
FIG. 5 is an illustration of an exemplary implementation involving a set of packet fragments for updating a remote database according to one or more embodiments of this disclosure.

As illustrated in FIG. 5, an exemplary implementation 500 may include and/or involve a set of at least packet fragments 112(1), 112(7), and 112(8). In some examples, computing device 100 may generate packet fragments 112(1) and 112(7) in connection with one or more changes made to database 110 in a single transaction. In such examples, computing device 100 may generate packet fragment 112(8) in connection with one or more additional changes made to database 110 in a subsequent transaction. In one example, computing device 100 may transmit and/or flood packet fragments 112(1), 112(7), and 112(8) across and/or through network 208. In this example, node 206 may receive packet fragments 112(1), 112(7), and 112(8) as they traverse and/or travel through network 208.

In some examples, node 206 may receive packet fragment 112(1) before packet fragments 112(7) and 112(8). In one example, packet fragments 112(1) and 112(7) may each include and/or contain a transaction identifier "54" and a list of other fragments corresponding to transaction "54". In this example, packet fragment 112(8) may each include and/or contain a transaction identifier "55" and a list of other fragments corresponding to transaction "55", meaning that packet fragment 112(8) resulted from the transaction that occurred just after transaction "54" on computing device 100.

Upon receiving packet fragment 112(1), node 206 may analyze packet fragment 112(1) and determine, based at least in part on this analysis, that packet fragments 112(1), 112(7), and 112(9) all correspond to transaction "54"-even though packet fragments 112(7) and 112(9) have yet to arrive at node 206. In one example, node 206 may subsequently receive packet fragment 112(7) and then analyze the same. However, node 206 may still be waiting for packet fragment 112(9) to complete the set corresponding to transaction "54" that occurred on computing device 100.

In the meantime, node 206 may receive packet fragment 112(8) and then analyze the same. During this analysis, node 206 may determine that packet fragments 112(8) and 112(9) all correspond to transaction "55"-even though packet fragment 112(9) has yet to arrive at node 206 in connection with either transaction "54" or transaction "55". Because transactions "54" and "55" both involved packet fragment 112(9), packet fragment 112(9) corresponding to transaction "55" may have rendered obsolete packet fragment 112(9) corresponding to transaction "54" for the purpose of updating the database on node 206. In fact, packet fragment 112(9) corresponding to transaction "54" may never actually arrive at and/or reach node 206.

In view of this observation, node 206 may wait for packet fragment 112(9) corresponding to transaction "55" to arrive before the database on node 206 is able to achieve consistency with database 110. Accordingly, upon receiving packet fragment 112(8) and learning that transaction "55" rendered obsolete packet fragment 112(9) corresponding to transaction "54", node 206 may proceed to process packet fragments 112(1) and 112(7) in connection with transaction "54" despite never receiving packet fragment 112(9) corresponding to transaction "54". Additionally or alternatively, upon receiving packet fragment 112(8) and learning that transaction "55" rendered obsolete packet fragment 112(9) corresponding to transaction "54", node 206 may wait until receiving packet fragment 112(9) corresponding to transaction "55" before processing all the relevant and/or up-to-date packet fragments corresponding to transactions "54" and "55".

Figure 6:
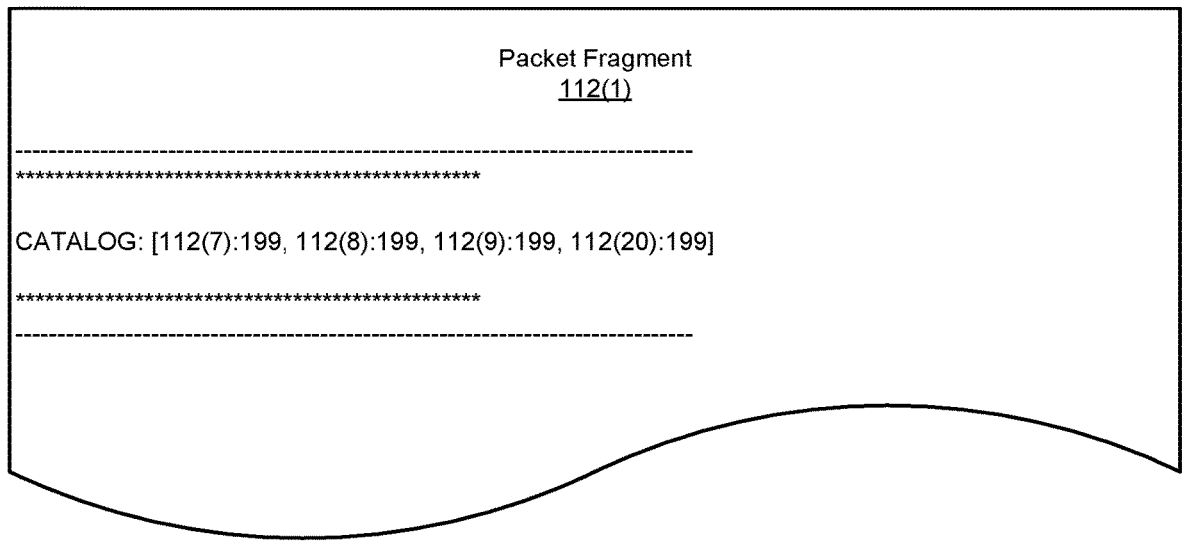
FIG. 6 is an illustration of an exemplary implementation involving a set of packet fragments for updating a remote database according to one or more embodiments of this disclosure.
Figure 6:
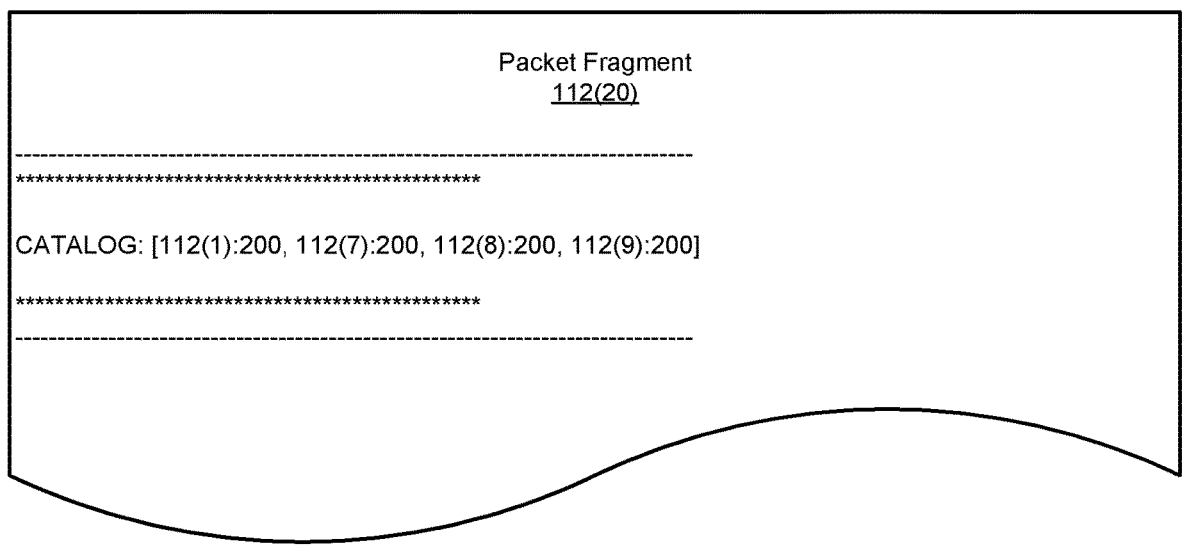

As illustrated in FIG. 6, an exemplary implementation 600 may include and/or involve a set of at least packet fragments 112(1) and 112(20). In some examples, computing device 100 may generate packet fragments 112(1) and 112(20) in connection with changes made to database 110 in two consecutive transactions (e.g., transactions "199" and "200"). In one example, computing device 100 may transmit and/or flood packet fragments 112(1) and 112(20) across and/or through network 208. In this example, node 206 may receive packet fragments 112(1) and 112(20) as they traverse and/or travel through network 208.

In some examples, node 206 may receive packet fragment 112(1) before packet fragment 112(20). In one example, packet fragment 112(1) may include and/or contain a catalog that identifies a sequence of all the packet fragments corresponding to transaction "199". In this example, the catalog of packet fragment 112(1) may identify and/or indicate which of the packet fragments correspond to and/or represent one or more changes relative to an earlier transaction (e.g., transaction "198"). Additionally or alternatively, packet fragment 112(20) may include and/or contain a catalog that identifies a sequence of all the packet fragments corresponding to transaction "200". In this example, the catalog of packet fragment 112(20) may identify and/or indicate which of the packet fragments correspond to and/or represent one or more changes relative to an earlier transaction (e.g., transaction "199").

In some examples, upon receiving packet fragment 112(1), node 206 may analyze packet fragment 112(1) and identify, based at least in part on this analysis, fragments 112(7), 112(8), 112(9), and 112(20) from transaction "199" as being needed to achieve and/or complete the update corresponding to transaction "199". In view of this identification, node 206 may wait for these 4 other packet fragments to arrive before processing any of the packet fragments corresponding to transaction "199". In one example, node 206 may subsequently receive packet fragment 112(20) and then analyze the same. In this example, node 206 may determine, based at least in part on the analysis, that packet fragments 112(1), 112(7), 112(8), and 112(9) identified in the catalog have changed relative to and/or since transaction "199". Accordingly, node 206 may discover that no other fragments besides packet fragments 112(1), 112(7), 112(8), and 112(9) changed due to transaction "200".

In some examples, a transaction may cause and/or result in the flooding of only a single packet. For example, node 206 may receive a single packet that accounts for and/or represents one or more changes made to the state of database 110 in a certain transaction. In this example, the packet may include and/or contain information indicating that no other packets and/or catalogs are needed to achieve and/or complete the update corresponding to that transaction. In view of this information, node 206 may proceed to process the single packet without delay.

Figure 7:
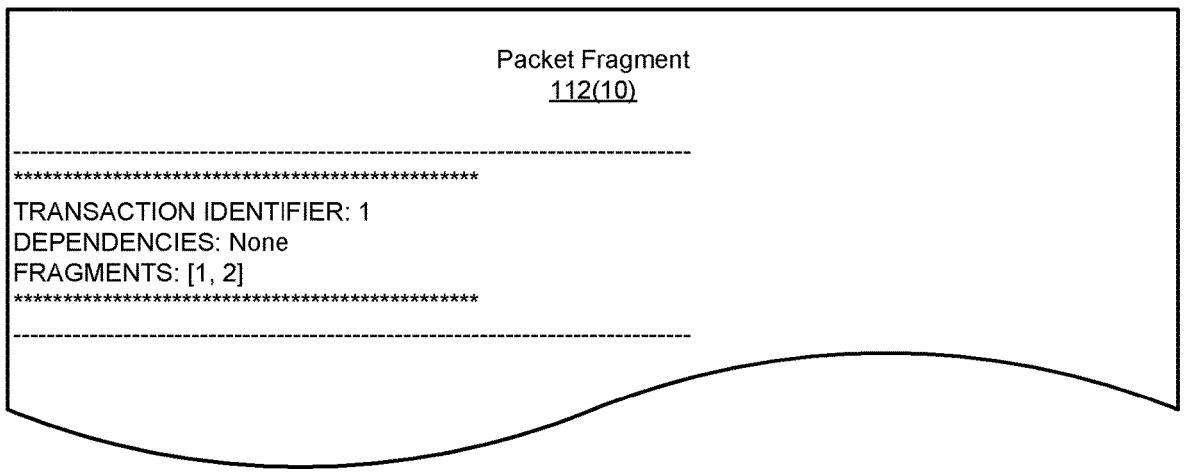
FIG. 7 is an illustration of an exemplary implementation involving a set of packet fragments for updating a remote database according to one or more embodiments of this disclosure.
Figure 7:
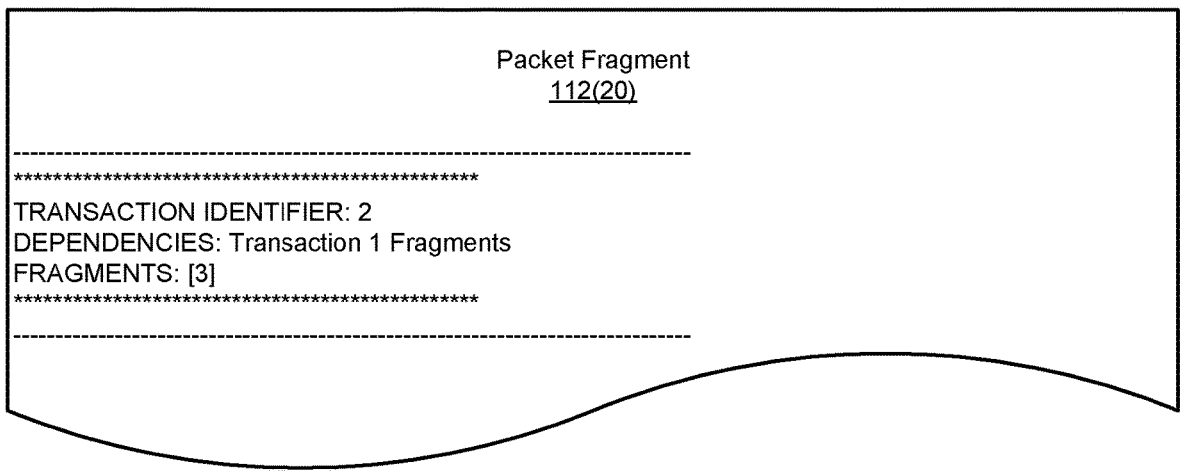
Figure 7:
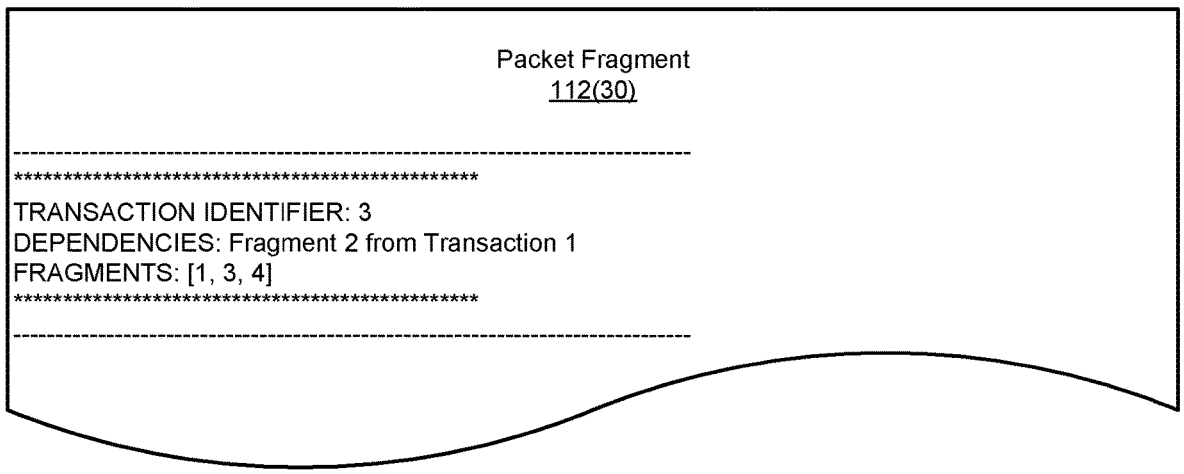

As illustrated in FIG. 7, an exemplary implementation 700 may include and/or involve a set of at least packet fragments 112(10), 112(20), and 112(30). In some examples, computing device 100 may generate packet fragments 112(10), 112(20), and 112(30) in connection with changes made to database 110 in three consecutive transactions (e.g., transactions "1", "2", and "3"). In one example, computing device 100 may transmit and/or flood packet fragments 112(10), 112(20), and 112(30) across and/or through network 208. In this example, node 206 may receive packet fragments 112(10), 112(20), and 112(30) as they traverse and/or travel through network 208.

In some examples, node 206 may receive packet fragment 112(10) before packet fragments 112(20) and 112(30). In one example, packet fragment 112(10) may include and/or contain a transaction identifier "1", a list of any dependencies external to and/or beyond transaction "1", and a list of other fragments corresponding to transaction "1". In this example, packet fragment 112(20) may include and/or contain a transaction identifier "2", a list of any dependencies external to and/or beyond transaction "2", and a list of other fragments corresponding to transaction "2". Additionally or alternatively, packet fragment 112(30) may include and/or contain a transaction identifier "3", a list of any dependencies external to and/or beyond transaction "3", and a list of other fragments corresponding to transaction "3".

In some examples, upon receiving packet fragment 112(10), node 206 may analyze packet fragment 112(10) and identify, based at least in part on this analysis, fragments "1" and "2" as corresponding to transaction "1". In such examples, node 206 may also identify no dependencies external to and/or beyond transaction "1" based at least in part on this analysis.

In some examples, upon receiving packet fragment 112(20), node 206 may analyze packet fragment 112(20) and identify, based at least in part on this analysis, fragment "3"

as corresponding to transaction "2". In one example, node 206 may also identify a dependency on all the fragments corresponding to transaction "1" based at least in part on this analysis.

In some examples, upon receiving packet fragment 112 (30), node 206 may analyze packet fragment 112(30) and identify, based at least in part on this analysis, fragments "1", "3", and "4" as corresponding to transaction "3". In one example, node 206 may also identify a dependency on fragment "2" corresponding to transaction "1" based at least in part on this analysis. In this example, node 206 may achieve consistency with the state of database 110 upon processing fragments "1", "3", and "4" corresponding to transaction "3" and fragment "2" corresponding to transaction "1". Accordingly, fragment "3" corresponding to transaction "3" may supplant and/or render obsolete fragment "3" corresponding to transaction "2" upon the arrival of packet fragment 112(30). As a result, node 206 may be able to achieve consistency with the state of database 110 without processing or even receiving packet 112(20).

Figure 8:
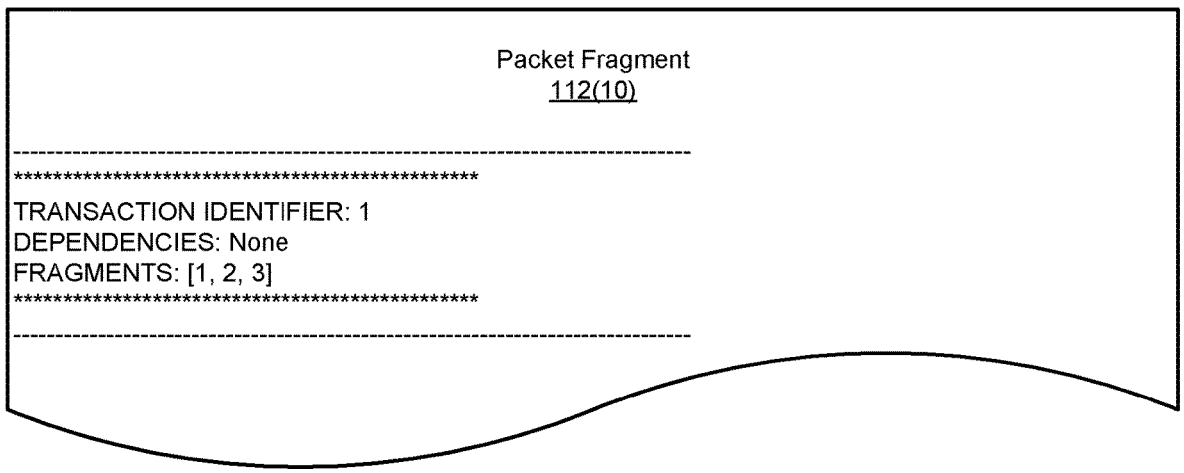
FIG. 8 is an illustration of an exemplary implementation involving a set of packet fragments for updating a remote database according to one or more embodiments of this disclosure.
Figure 8:
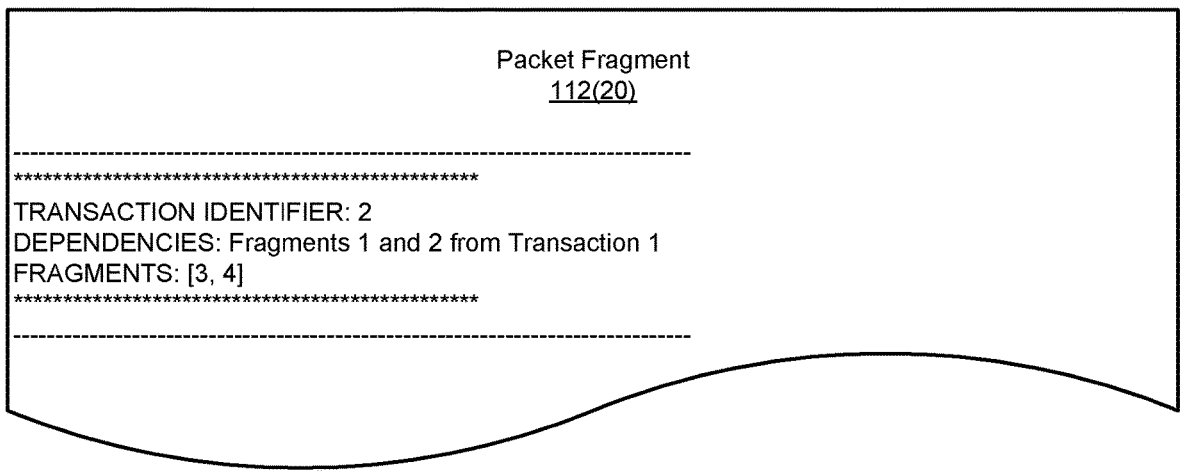
Figure 8:
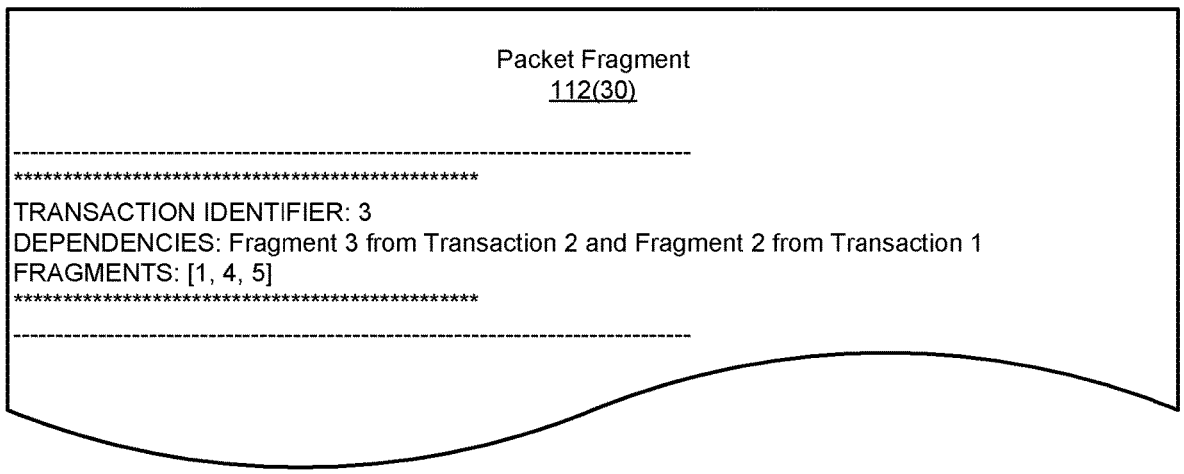

As illustrated in FIG. 8, an exemplary implementation 800 may include and/or involve a set of at least packet fragments 112(10), 112(20), and 112(30). In some examples, computing device 100 may generate packet fragments 112 (10), 112(20), and 112(30) in connection with changes made to database 110 in three consecutive transactions (e.g., transactions "1", "2", and "3"). In one example, computing device 100 may transmit and/or flood packet fragments 112(10), 112(20), and 112(30) across and/or through network 208. In this example, node 206 may receive packet fragments 112(10), 112(20), and 112(30) as they traverse and/or travel through network 208.

In some examples, node 206 may receive packet fragment 112(10) before packet fragments 112(20) and 112(30). In one example, upon receiving packet fragment 112(10), node 206 may analyze packet fragment 112(10) and identify, based at least in part on this analysis, fragments "1", "2", and "3" as corresponding to transaction "1". In this example, node 206 may also identify no dependencies external to and/or beyond transaction "1" based at least in part on this analysis.

In some examples, upon receiving packet fragment 112 (20), node 206 may analyze packet fragment 112(20) and identify, based at least in part on this analysis, fragments "3" and "4" as corresponding to transaction "2". In one example, node 206 may also identify fragments "1" and "2" from transaction "1" as dependencies based at least in part on this analysis.

In some examples, upon receiving packet fragment 112 (30), node 206 may analyze packet fragment 112(30) and identify, based at least in part on this analysis, fragments "1", "4", and "5" as corresponding to transaction "3". In one example, node 206 may also identify fragment "3" from transaction "2" and fragment "2" from transaction "1" as dependencies based at least in part on this analysis. In this example, node 206 may maintain and/or track a transitive dependency chain across transactions "1", "2", and "3" and then resolve the dependency chain across these transactions to determine how to achieve consistency with the state of database 110.

For example, by maintaining and/or tracking this dependency chain, node 206 may determine that fragments "1", "4", and "5" from transaction 3, fragment "3" from transaction "2", and fragment "2" from transaction "1" are necessary to achieve consistency with the state of database 110. In response to this determination, node 206 may address these dependencies by awaiting any unarrived packet fragments and then, once all have arrived, processing all these packet fragments. By doing so, node 206 may ensure that its database reflects the state of database 110 and thus accounts for the changes made in transactions "1", "2", and "3".

Figure 9:
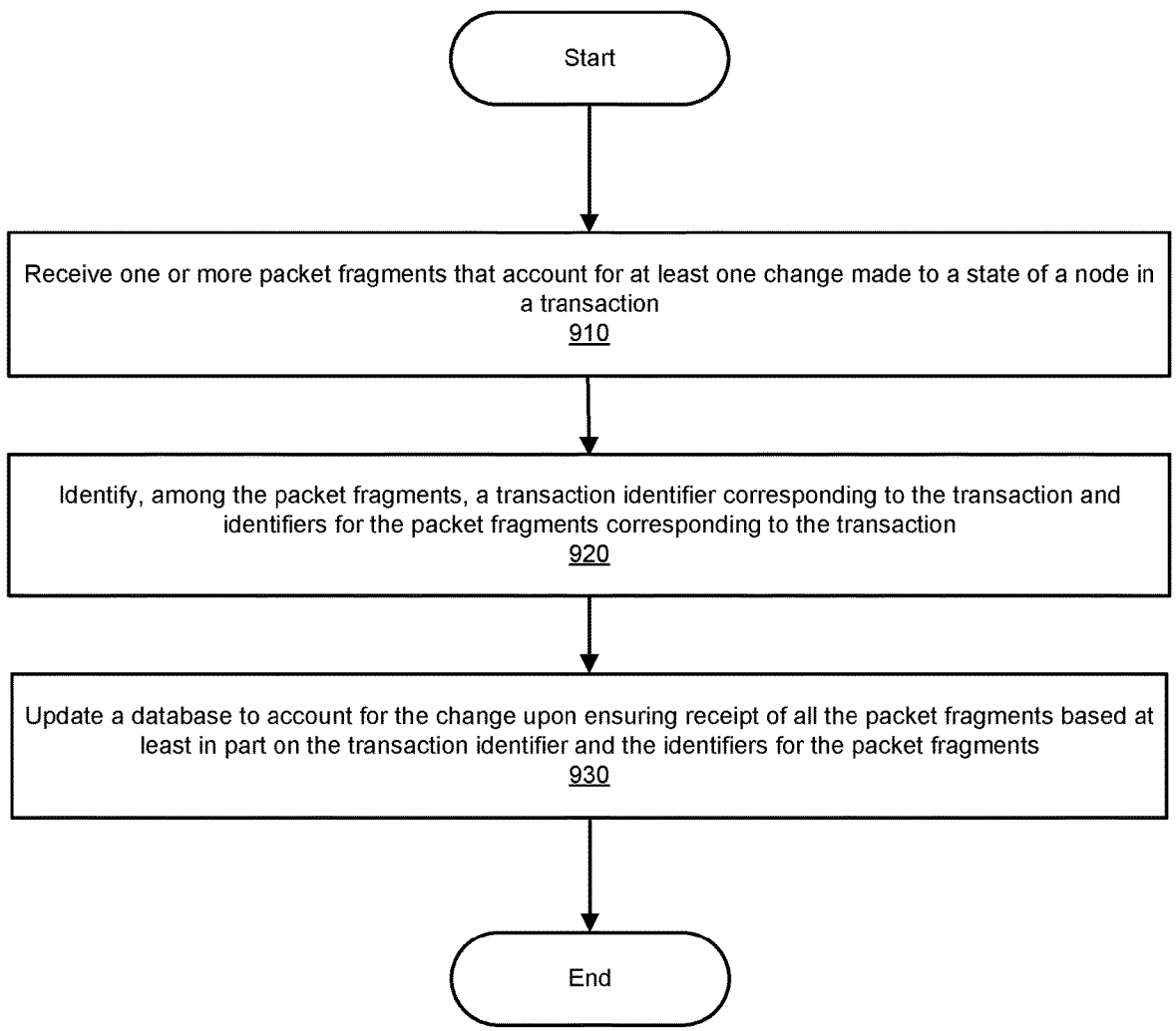
FIG. 9 is a flow diagram of an exemplary method for updating remote databases via flooded packet fragments according to one or more embodiments of this disclosure.

FIG. 9 is a flow diagram of an exemplary method 900 for updating remote databases via flooded packet fragments. In one example, the steps shown in FIG. 9 may be performed by a computing device that receives flooded packet fragments within an IS-IS database. Additionally or alternatively, the steps shown in FIG. 10 may incorporate and/or involve certain sub-steps and/or variations consistent with the descriptions provided above in connection with FIGS. 1-8.

As illustrated in FIG. 9, method 900 may include and/or involve the step of receiving one or more packet fragments that account for at least one change made to a state of a node in a transaction (910). Step 910 may be performed in a variety of ways, including any of those described above in connection with FIGS. 1-8. For example, a receiving node included in a network may receive one or more packet fragments that account for at least one change made to a state of an originating node in a transaction. In this example, the packet fragments may traverse and/or travel through the network via a flooding scheme and/or protocol.

Method 900 may also include and/or involve the step of identifying, among the packet fragments, a transaction identifier corresponding to the transaction and identifiers for the packet fragments corresponding to the transaction (920). Step 920 may be performed in a variety of ways, including any of those described above in connection with FIGS. 1-8. For example, the receiving node may identify, among the packet fragments, a transaction identifier corresponding to the transaction and an indication of the total number of packet fragments corresponding to the transaction.

Method 900 may further include and/or involve the step of updating a database to account for the change upon ensuring receipt of all the packet fragments corresponding to the transaction based at least in part on the transaction identifier and the indication (930). Step 930 may be performed in a variety of ways, including any of those described above in connection with FIGS. 1-8. For example, the receiving node may update a database to account for the change upon ensuring receipt of all the packet fragments corresponding to the transaction based at least in part on the transaction identifier and the identifiers for the packet fragments.

Figure 10:
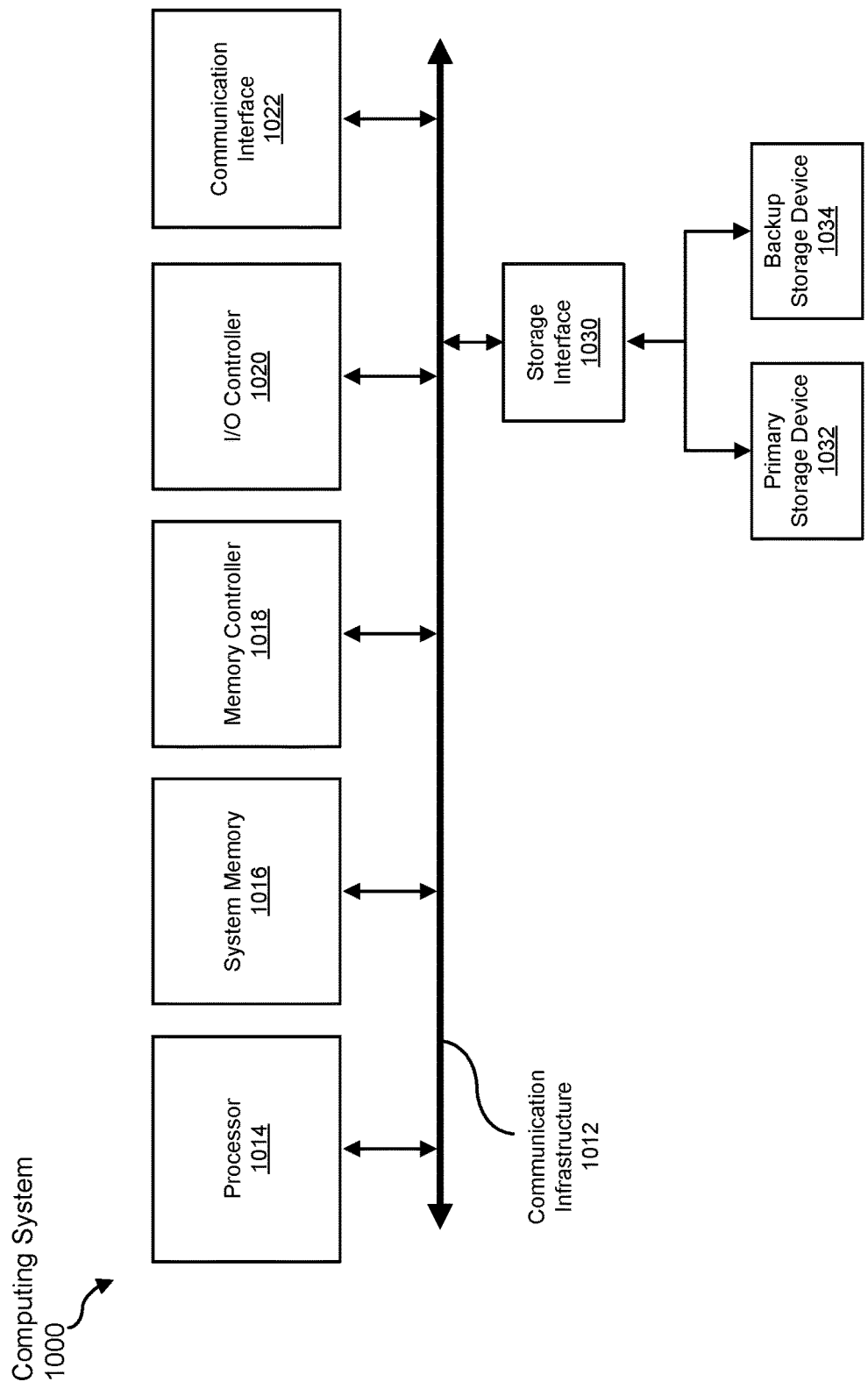
FIG. 10 is a block diagram of an exemplary computing system capable of implementing and/or being used in connection with one or more of the embodiments described in this disclosure.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/ or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an ASIC, a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of computing device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
   a storage device configured to store a database that identifies states of nodes included in a network; and
   circuitry configured to:
   receive packet fragments that account for at least one change made to a state of one of the nodes in a transaction;
   identify, in each of the packet fragments, a global transaction identifier that indicates the transaction and is represented by a single number;
   identify, among the packet fragments, identifiers for the packet fragments; and
   update the database to account for the change upon ensuring receipt of all the packet fragments based at least in part on the global transaction identifier and the identifiers for the packet fragments.

2. The computing device of claim 1, wherein the packet fragments each comprise the global transaction identifier and a list of every other packet fragment representative of the transaction.

3. The computing device of claim 2, wherein the list comprises a packet identifier for every other packet fragment representative of the transaction.

4. The computing device of claim 1, wherein:
the packet fragments each include the global transaction identifier; and
at least one of the packet fragments includes information that identifies a cardinality of the packet fragments corresponding to the transaction.

5. The computing device of claim 4, wherein the information comprises a catalog that identifies a sequence of all the packet fragments representative of the transaction.

6. The computing device of claim 5, wherein the catalog identifies which of the packet fragments represent the change relative to another transaction that preceded the transaction.

7. The computing device of claim 1, wherein the circuitry is further configured to update the database to reflect the state of the one of the nodes such that the database and the state of the one of the nodes are consistent with one another.

8. The computing device of claim 7, wherein the circuitry is further configured to:
determine at least one dependency external to the transaction that is necessary for the database to reflect the state of the one of the nodes; and
address the dependency to ensure that the database reflects the state of the one of the nodes upon accounting for the change.

9. The computing device of claim 8, wherein the dependency comprises at least one packet fragment representative of another transaction that preceded the transaction; and
the circuitry is further configured to address the dependency by awaiting receipt of the packet fragment representative of the another transaction before updating the database based at least in part on the packet fragment representative of the another transaction and the packet fragments representative of the transaction.

10. The computing device of claim 8, wherein the dependency comprises at least one packet fragment representative of another transaction that preceded the transaction; and
the circuitry is further configured to address the dependency by:
determining that the packet fragment representative of the another transaction has been rendered obsolete; and
updating the database based at least in part on the packet fragments representative of the transaction due at least in part to the packet fragment having been rendered obsolete.

11. The computing device of claim 10, wherein the circuitry is further configured to determine that the packet fragment representative of the another transaction has been rendered obsolete by at least one of:
identifying one of the packet fragments representative of the transaction that supplants the packet fragment representative of the another transaction in connection with the change; or
identifying a packet fragment representative of a further transaction that supplants the packet fragment representative of the another transaction in connection with the change.

12. The computing device of claim 1, wherein:
the packet fragments comprise a first fragment and a second fragment that both represent the transaction; and
the circuitry is further configured to:
receive the first fragment;
determine, based at least in part on the identifiers, that the second fragment is necessary to account for the change; and
in response to determining that the second fragment is necessary, awaiting receipt of the second fragment before updating the database based at least in part on the first fragment and the second fragment.

13. A system comprising:
a first node included in a network and configured to:
change a state of a database in a transaction; and
transmit packet fragments that account for the change through the network; and
a second node included in the network and configured to:
receive the packet fragments;
identify, in each of the packet fragments, a global transaction identifier that indicates the transaction and is represented by a single number;
identify, among the packet fragments, identifiers for the packet fragments; and
update an additional database to account for the change upon ensuring receipt of all the packet fragments.

14. The system of claim 13, wherein the packet fragments each comprise the global transaction identifier and a list of every other packet fragment representative of the transaction.

15. The system of claim 14, wherein the list comprises a packet identifier for every other packet fragment representative of the transaction.

16. The system of claim 13, wherein:
the packet fragments each include the global transaction identifier; and
at least one of the packet fragments includes information that identifies a cardinality of the packet fragments corresponding to the transaction.

17. The system of claim 16, wherein the information comprises a catalog that identifies a sequence of all the packet fragments representative of the transaction.

18. The system of claim 17, wherein the catalog identifies which of the packet fragments represent the change relative to another transaction that preceded the transaction.

19. The system of claim 13, wherein the second node is further configured to update the additional database to reflect the state of the database such that the database and the additional database are consistent with one another.

20. A method comprising:
receiving packet fragments that account for at least one change made to a state of a node in a transaction;
identifying, in each of the packet fragments, a global transaction identifier that indicates the transaction and is represented by a single number;
identifying, among the packet fragments, identifiers for the packet fragments; and
updating a database to account for the change upon ensuring receipt of all the packet fragments based at least in part on the global transaction identifier and the identifiers for the packet fragments.

* * * * *